(12) United States Patent
Ollila et al.

(10) Patent No.: US 8,115,855 B2
(45) Date of Patent: Feb. 14, 2012

(54) METHOD, AN APPARATUS AND A COMPUTER READABLE STORAGE MEDIUM FOR CONTROLLING AN ASSIST LIGHT DURING IMAGE CAPTURING PROCESS

(75) Inventors: Mikko Ollila, Tampere (FI); Mikko Muukki, Tampere (FI); Ossi Mikael Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 369 days.

(21) Appl. No.: 12/407,042

(22) Filed: Mar. 19, 2009

(65) Prior Publication Data

US 2010/0238342 A1    Sep. 23, 2010

(51) Int. Cl.
G03B 13/00 (2006.01)
(52) U.S. Cl. ........................ 348/345; 396/106
(58) Field of Classification Search ........... 396/106–110
See application file for complete search history.

(56) References Cited

U.S. PATENT DOCUMENTS

| | | | |
|---|---|---|---|
| 6,115,555 A | 9/2000 | Ueda et al. | |
| 7,126,640 B1 | 10/2006 | Takei | |
| 2005/0178950 A1 | 8/2005 | Yoshida | |
| 2006/0001763 A1 | 1/2006 | Takemoto | |
| 2006/0198624 A1 | 9/2006 | Ono et al. | |
| 2007/0206938 A1* | 9/2007 | Tanaka | 396/106 |
| 2008/0037976 A1* | 2/2008 | Funaki et al. | 396/108 |

FOREIGN PATENT DOCUMENTS

| | | |
|---|---|---|
| JP | 2000196951 | 7/2000 |
| JP | 2000253302 | 9/2000 |
| JP | 2006178263 | 7/2006 |
| JP | 2007267278 | 10/2007 |
| JP | 2010054968 | 3/2010 |

OTHER PUBLICATIONS

English Abstract of Japanese Publication No. JP 2000196951, Cannon KK, published Jul. 14, 2000 (1 page).
English Abstract of Japanese Publication No. JP 2006178263, Matsushita Electric Ind Co Ltd, published Jul. 6, 2006 (1 page).
English Abstract of Japanese Publication No. JP 2000253302, Olympus Optical, published Sep. 14, 2000 (1 page).
English Abstract of Japanese Publication No. 2007267278, Kyocerea Corp., published Oct. 11, 2007 (1 page).
Partial Machine translation (claims 1-7 and paragraphs [0001]-[0073]) from Japanese Patent Office of JP 2010054968, published Mar. 11, 2010 (15 pages).
International Search Report and Written Opinion of the International Searching Authority mailed May 10, 2010 in parallel International Application No. PCT1IF2010/050074 (13 pages).

* cited by examiner

*Primary Examiner* — Clayton E LaBalle
*Assistant Examiner* — Dennis Hancock

(57) ABSTRACT

Digital photographing devices traditionally comprise an assist light that illuminates the object being photographed in low light conditions The solution concerns a method comprising exposing an image frame comprising a window of interest; performing an autofocus for the window of interest; and controlling an assist light for the autofocus according to an exposure of the window of interest. The solutions is also targeted to an apparatus and a computer-readable storage means.

11 Claims, 4 Drawing Sheets

METHOD, AN APPARATUS AND A COMPUTER READABLE STORAGE MEDIUM FOR CONTROLLING AN ASSIST LIGHT DURING IMAGE CAPTURING PROCESS

TECHNICAL FIELD

This invention relates to a method, to an apparatus and a computer readable storage medium for controlling an assist light during image capturing process.

BACKGROUND

Digital photographing devices traditionally comprise an image sensor, an autofocus (AF) system and an assist light that illuminates the object being photographed in low light conditions. CMOS (Complementary Metal Oxide Semiconductor) and CCD (Charge Coupled Device) are typical examples of image sensors. The operation between these sensors is different. For CCD sensor's each pixel reacts to light and stores the electrical charge caused by the light, which charge is further transmitted to be converted to a voltage. In the CMOS sensor, each pixel, on the other hand, is configured to convert the charge to voltage whereby the charge does not need to be transmitted anywhere. In addition to the charge-to-voltage conversion, a CMOS sensor may include AD conversion and some signal processing means as well. An image sensor is equipped with a shutter, such as e.g. a rolling shutter for CMOS sensor. A global shutter exposes entire image frame simultaneously, whereas the rolling shutter exposes different points of the frame at different points of time—in practice exposing the frame line by line.

The image sensor of the camera is configured to produce image data for the autofocus unit. Autofocus system is configured to move a lens of the device in and out until the image is in its sharpest form. The autofocus unit calculates parameters for the motor adjusting the position of the lens on the basis of the data. The assist light assists the photographing device's focusing system during capturing process. Because of power and heat generation reasons, the assist light cannot be high power.

This problem has been approached with solutions, where suitable current is drawn continuously or PWM (Pulse Width Modulation) dimmed to the assist light. The PWM reduces the total amount of power delivered to the assist light. However, when the assist light is powered with small amount of power, the light does not become as bright as the reliable autofocus would expect. Therefore an improved solution for more reliable autofocus is needed.

SUMMARY

This application discloses a method, an apparatus, and computer program product for controlling the assist light by image sensor so that the assist light is active only for a certain part of the image frame. Rest of the frame the assist light can cool down.

An example of the method comprises exposing an image frame comprising a window of interest; performing an autofocus for the window of interest; controlling an assist light for the autofocus according to an exposure of the window of interest.

An example of the apparatus comprises a shutter configured to expose an image frame comprising a window of interest; an autofocus controller configured to perform an autofocus for the window of interest; and an assist light configured to assist the autofocus unit according to an exposure of the window of interest.

An example of a computer-readable storage medium being encoded with instructions that when executed by a computer, perform: exposing an image frame comprising a window of interest; performing an autofocus for the window of an interest; controlling an assist light for the autofocus according to an exposure of the window of interest.

The present solution provides more reliable autofocus even at low light condition or less power consumption at the same performance level as in prior solutions. Also smaller photographing devices may be used, because smaller assist light can be utilized, and because of less heat sink.

DESCRIPTION OF THE DRAWINGS

The solution is described in more detailed manner by examples in the following disclosure and in the drawings, where.

DETAILED DESCRIPTION

The present solution relates to electronic devices with camera means and especially to an improvement of autofocus performance in low light conditions by accurate triggering to autofocus assist light in such a device.

Currently there are various electronic devices comprising camera means. For example, mobile stations, PDA (Personal Digital Assistant) devices, communicators and surveillance cameras has photographing means incorporated therein. Therefore, in this connection, the term "electronic device" should be interpreted widely. For example, an electronic device can be a device, which is equipped, or which can be equipped with a digital imaging capability.

Figure 1:
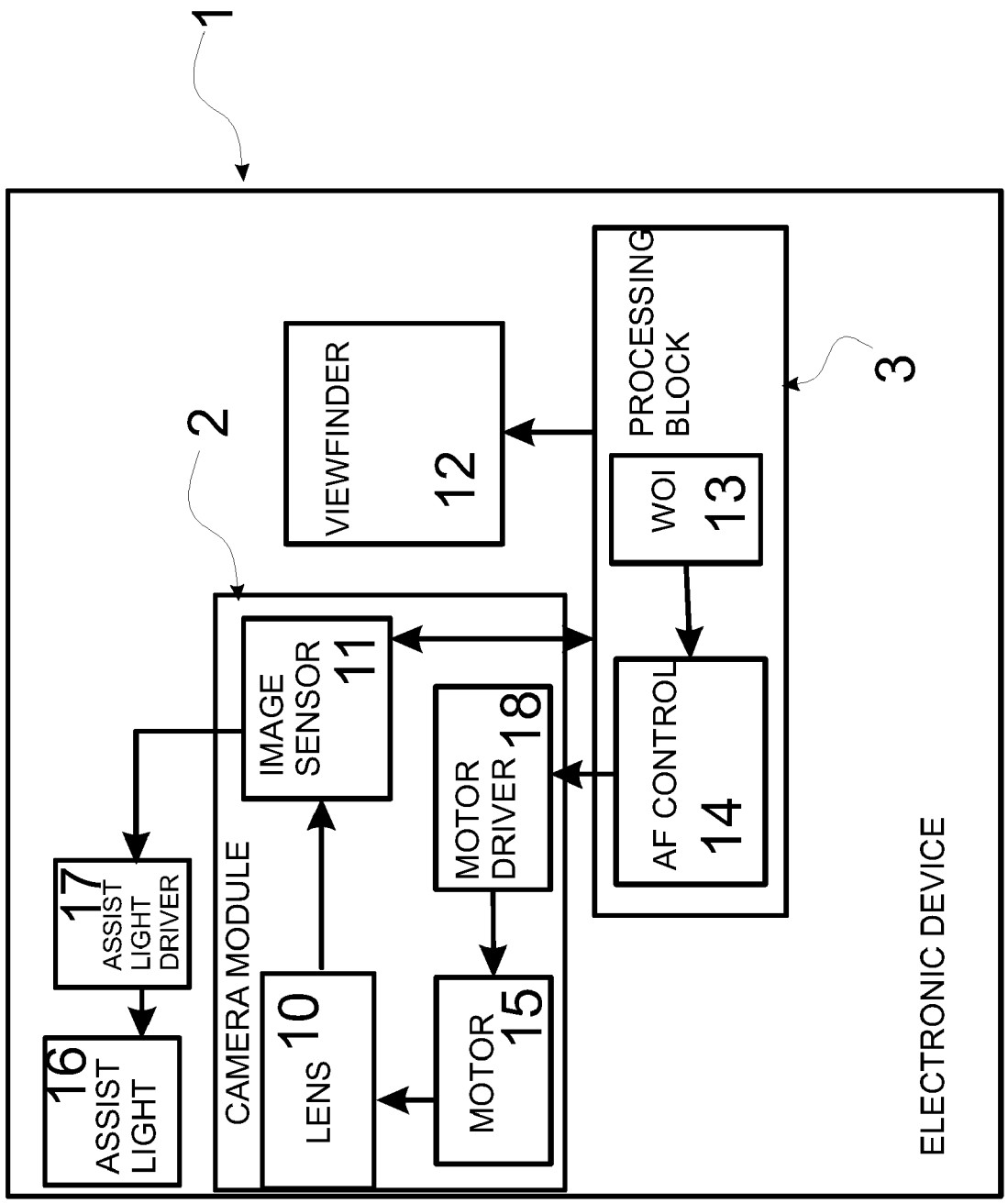
FIG. 1 illustrates an example of an electronic device comprising camera means.

An example of the electronic device for photographing 1 is illustrated in FIG. 1. The device comprises a lens 10 and an image sensor 11 configured to produce an image. The image sensor 11 can be a CMOS sensor or a CCD sensor. The device 1 also comprises a shutter (employed with the image sensor 11) for performing the exposure of the image frame. The device 1 comprises also image processing means that relate to the image sensor 11 and may locate on a camera module 2, on a separate processing circuit, on an application engine of a mobile device, or on a combination of the previous. In the example of FIG. 1, the processing means is located in a processing block 3 (i.e. an image engine). The image produced by the image sensor 11 is processed in the processing block 3 and transmitted to a viewfinder 12 to be displayed to the user. This processing block may also be aware of a window of interest 13 (will be discussed in greater detail below) of an image frame. In addition, the electronic device comprises an autofocus control 14 for controlling the motor 15 via motor driver 18. The motor 15, on the other hand, is configured to control the movement of the lens 10. When speaking of a lens in this description, optics comprising e.g. a traditional lens or a liquid lens or similar is meant. Therefore when "lens movement" or "moving of a lens" is written in the description, the skilled person will appreciate that the moving is actually operation of a traditional lens, but when e.g. liquid lens is used, the moving is a some other adjusting operation, by means of which the light can be projected to the image sensor and by means of which the image can be focused.

Figure 2:
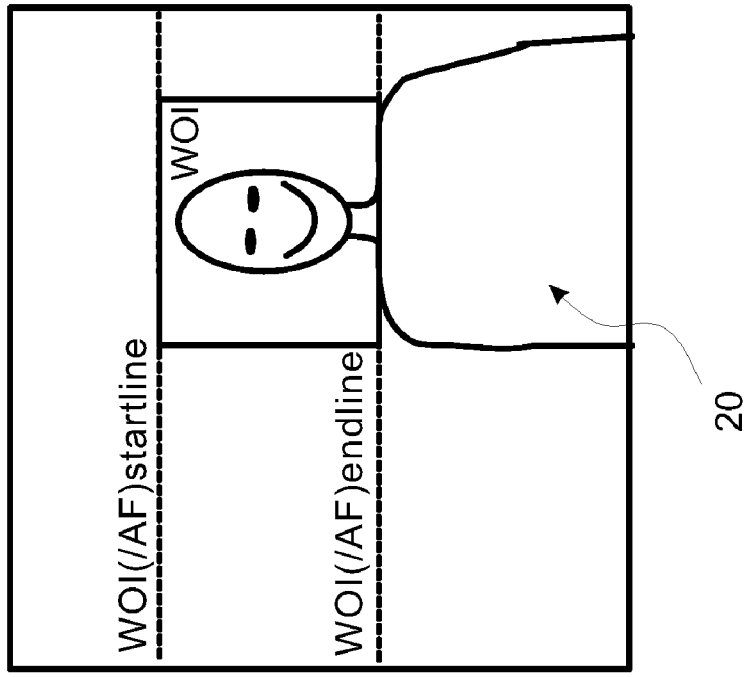
FIG. 2 illustrates an example of window of interest of a image frame.
Figure 2:
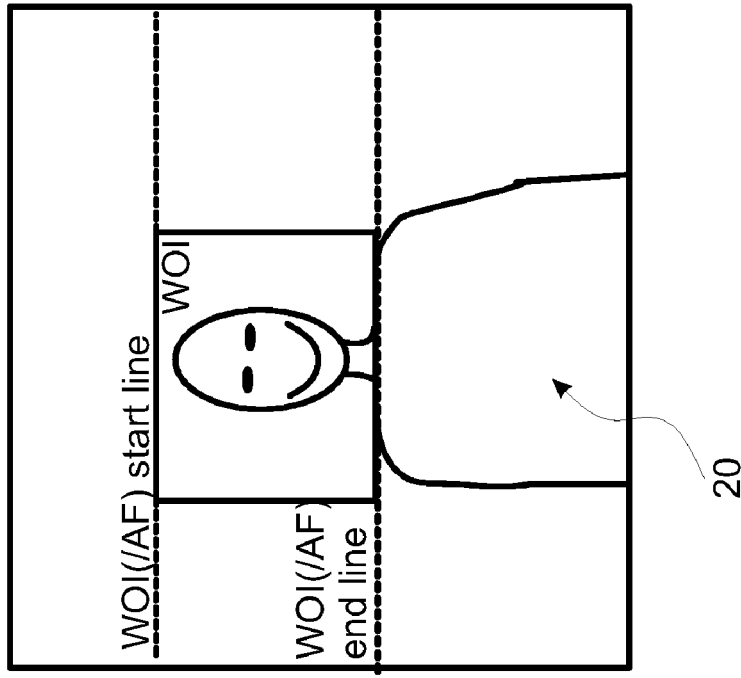

The electronic device 1 comprises also an assist light 16 that can be controlled by the image sensor 11 according to a information on a window of interest (WOI). The light 16 can also be controlled by an engine (will be described in more detail later). In this example, the assist light 16 is a led. A simplified example of a window of interest (WOI) is illustrated in FIG. 2. FIG. 2 presents two frames, FRAME 1 and FRAME 2, showing a target 20. The window of interest WOI is shown as a space between the dash lines. The dash lines illustrate the WOI(/autofocus) start line and the WOI(/autofocus) end line, which means that when those lines and all lines between them are exposed, the assist led should be on ("LED ON"). In FIG. 2 an area for WOI is defined, which is used for determining autofocus statistics. This means that the autofocus statistics is determined from the WOI area, whereby the "window of interest" can be interpreted to be also the area for calculating autofocus statistics ("AF area"). The WOI and the AF area can be also of different sizes (e.g. in the video capturing, where AF area can be smaller than the video being captured representing the WOI with regard to the present solution). In such a situation, the larger area (i.e. the WOI) is to be used for determining the LED ON time. In the example of FIG. 2, the sensor readout is carried out line by line. It is appreciated that if the readout of the sensor was column by column, the dash lines in the image would have been drawn vertical.

The height of WOI in relation to height of the image frame is typically 10-60%. This may however vary. For example, when using exposure of rolling shutter, the time outside the WOI may be only 10-15%. The time outside the WOI may depend on the length of the exposure and on the length of the vertical blanking time (in addition to the height of the WOI). For example, the height of 40%, the exposure time of 50% and blanking time of 20% may be resulted in led-off time of 17%. This can be determined as follows: the readout time of a frame is e.g. 50 ms where blanking time is 20% (50 ms*0.2=10 ms), the frame period is then 50 ms+10 ms=60 ms. The exposure time is 50%, wherein 60 ms*50%=30 ms. The height is 40%, wherein 50 ms*0.4=20 ms, whereby led-on time is 30 ms+20 ms=50 ms and led-off time is 60 ms−50 ms=10 ms. This corresponds 16.66% (=10 ms/60 ms).

The WOI may be static and located in the middle of the frame, but the WOI may be moving as well, so that it varies frame by frame (see the position of the target 20 in frames "FRAME1" and "FRAME2"). Various solutions for determining the WOI in the image frame can be found from documents of related art. In future, WOI information can also be based on face (detection and) tracking. For the present solution, it does not matter, how the information on WOI is obtained. What matters, is that the information on the WOI is available for the camera module or engine for assist light timing purposes. Therefore, this disclosure does not concentrate on those different solutions for determining WOI.

The image sensor 11 of the electronic device 1 is configured to output continuously trigger pulses during autofocus. In addition to the trigger pulses, also I2C-commands or other mechanism for communication can be used, if the used channel (or mechanism) provides accurate and fast timing. As illustrated simply in FIG. 3, the sensor is configured to output a high level signal of strobe trigger that controls the AF assist light. The sensor times the pulse accurately for the window of interest (WOI) of the autofocus. When the exposure of the first line of the window of interest is started, the trigger is output to AF assist light driver 17 (in FIG. 1) and the strobe signal rises and the assist light 16 is turned on. When the last line of window of interest has been exposed, the trigger from image sensor 11 goes down and the AF assist light 16 is turned off ("LED OFF"). This is repeated in the next AF frame and so on. For the best timing accuracy, also the times needed for up and down the signal level have to be known and utilized. This procedure makes it possible to direct the output light power on an image area that is the most important for AF calculations. Similarly, the solution enables cooling off the assist light during lines outside the WOI, as a result of which a greater current can be used. This means that more light will be produced for the part of the image that is used to AF calculations, which makes the AF more reliable even at low light conditions. In the prior solutions, the sensor has not output trigger that could have been used to direct the light on the AF WOI area only. In some situations, it may be useful to check how the colour temperature of the flash light will change due the assist light cooling or higher voltage in the assist light. This, however, is not a big issue, since the light is needed only for AF assistance.

Figure 3:
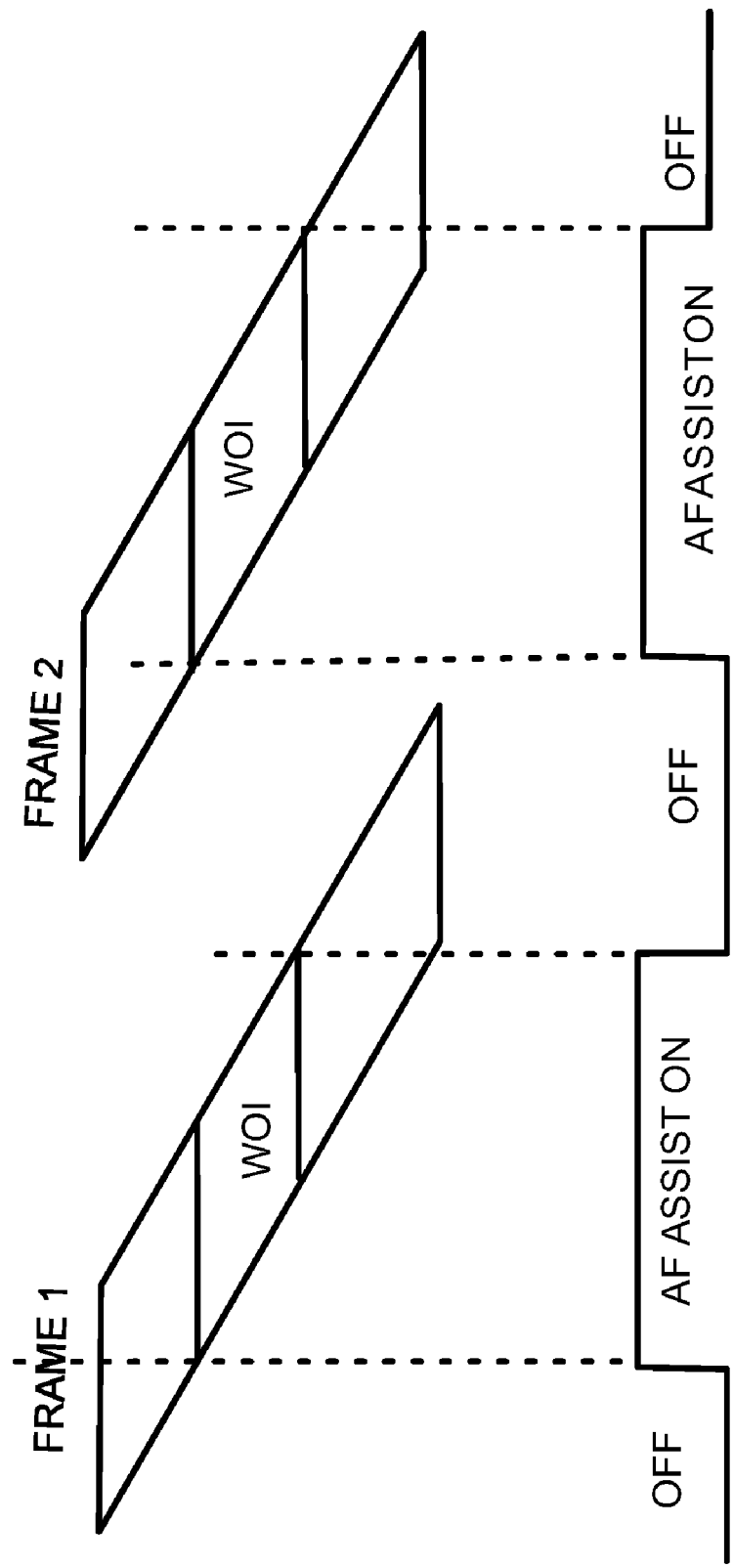
FIG. 3 illustrates a reduced example of a timing of the assist light.
Figure 4:
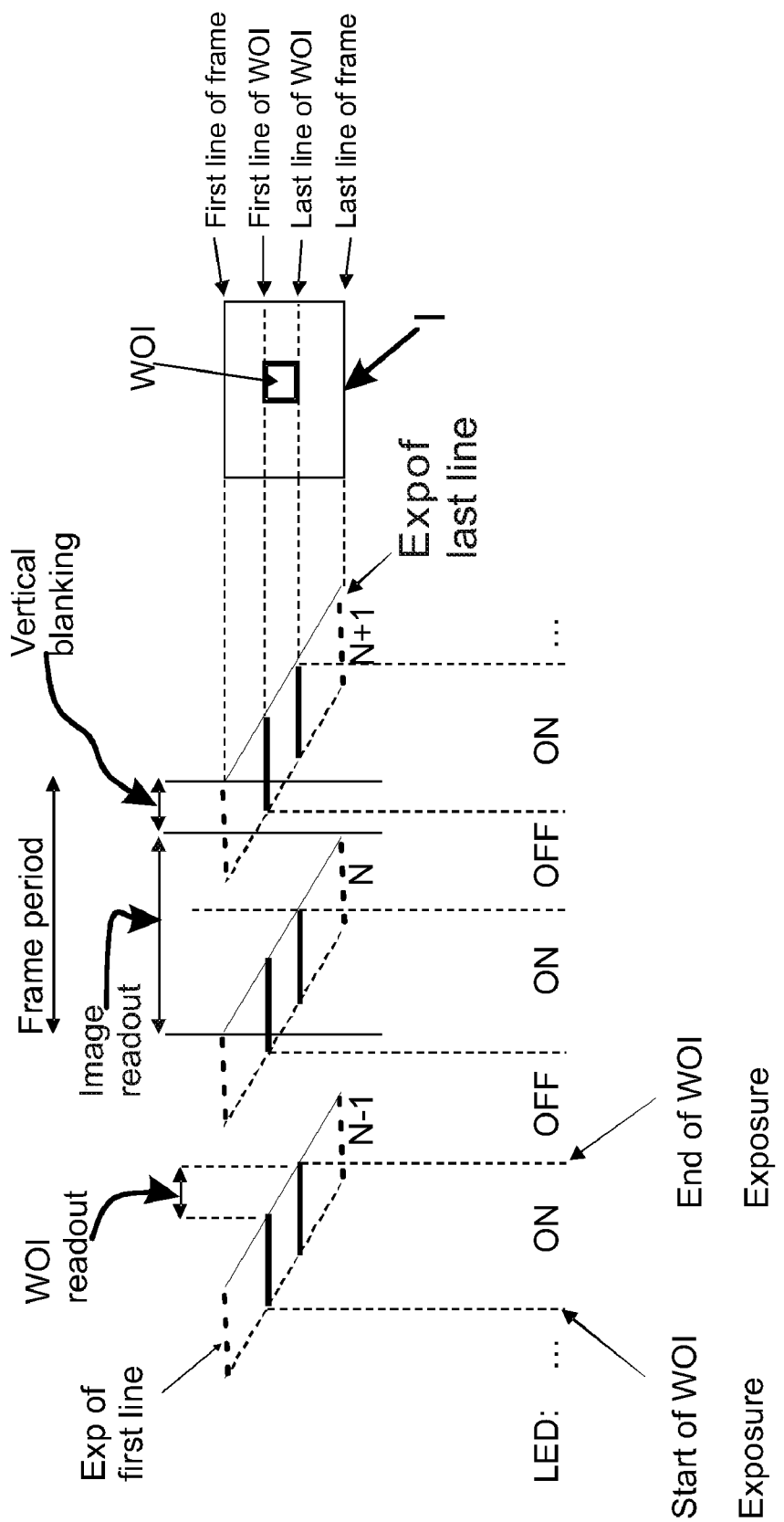
FIG. 4 illustrates an example of FIG. 3 in more detailed manner.

As said, FIG. 3 illustrates the present solution simply. More detailed illustration is in FIG. 4, representing an image frame I comprising a window of interest WOI. FIG. 4 shows first line of a frame, first line of WOI, last line of WOI and last line of frame in respect of the image frame I. FIG. 4 illustrates readout and exposure of three image frames (N−1, N, N+1), but details have been made for one frame only for the sake of clarity. It is appreciated that the details apply to other frames respectively.

In FIG. 4, the readout of the window of interest is shown with regard to the first image frame (N−1). It can be seen that at the time the WOI is being exposed, the led is ON. A frame period is described by means of next two image frames (N, N+1). The frame period consists of an image readout and vertical blanking. The vertical blanking occurs between the readout of the current image (N) and the readout of the next image (N+1). Current frame period (N) means also maximum exposure of a first line of the next image (N+1).

FIG. 4 also shows an exposure of the first line and an exposure of the last line in connection with first (N−1) and last (N+1) image frames being presented by the figure.

In previous, the mechanism for delivering AF WOI information from processor system 3 to the camera module 2 has been described. In another embodiment, the pulses may be generated by the host engine knowing the exposure times of the lines. In addition to the host engine, the pulses may be generated by an imaging engine, another engine or a converter, which comprises the receiver of the camera channel. Also, when the WOI information (using e.g. face tracking, static WOI or moving WOI) is already determined in the host engine containing camera interface receiver, the information of WOI does not need to transmit to the camera module, but the host engine may perform the timing of the assist light by itself.

Sometimes frames are skipped during the AF process due to the lens actuators, AF measurement process, interface or camera delays etc. This is an unwanted event, but if it is occurred, the importance of the solution increases even more. This means that the timing of the area outside the AF WOI will increase, whereby the assist light can be off or with smaller power more time and the bright light pulse is not needed for each frame. For this, it would be useful to let the receiver to make the timing because the receiver is already aware of which frames are used for calculating autofocus and which are not.

A main flash can also be used for AF assistance for the present solution. If the main flash is used also for capturing the image, then the automatic white balance (AWB) and automatic exposure (AE) can also be improved during the autofocus.

The present solution provides the more led-off time, the faster the readout, the longer the blanking time and the smaller the height of the WOI are.

In the previous, an example of capturing a still image has been disclosed. However, the present solution may be utilized also in video capturing. In such a process, it is possible to shut down or to attenuate the led if there is led-off time between frames. This is possible if the exposure time is not very long and, on the other hand, if the blanking time is long. According to this it would be possible to add the utility of the flash light in the video capturing (and also to reduce warming and power consumption).

In the case of video capturing the window of interest would be 100% of the height of the image frame, or if zooming is made digitally, the WOI would be a smaller portion depending on the cropped area and the method of making and transmitting the crop region.

The present solution can be carried out by means of a computer program comprising instructions for performing the control of the assist light.

The previous description discloses examples for controlling the assist light during autofocus. It is appreciated that the previous examples are provided for understanding purposes and that the following claims define the scope of the invention.

The invention claimed is:

1. A method comprising
exposing an image sensor to light during an image frame period including a window of interest period having a shorter duration than the image frame period;
performing an autofocus, but only during the window of interest period of the image frame period;
turning on an assist light for the autofocus, but only during exposure of the image sensor in the window of interest period of the image frame period.

2. The method according to a claim 1, comprising turning on the assist light when the exposure of the window of interest period is started, and turning off the assist light when the exposure of the window of interest period is finished.

3. The method according to claim 1, comprising receiving information of a window of interest position within an image frame.

4. The method according to claim 1, comprising generating trigger pulses during the autofocus for control of the assist light.

5. An apparatus comprising
a shutter configured to expose an image sensor to light during an image frame period comprising a window of interest period included within the image frame period and having a shorter duration than the image frame period;
an autofocus controller configured to perform an autofocus, but only during the window of interest period of the image frame period; and
an assist light configured to assist the autofocus controller, but only during exposure of the image sensor to light in the shorter duration window of interest period of the image frame period.

6. The apparatus according to claim 5, configured to turn the assist light on when the exposure of the window of interest period is started, and to turn the assist light off when the exposure of the window of interest period is finished.

7. The apparatus according to claim 5, wherein the image sensor is rectangular in shape and configured to receive information concerning a rectangular area of the window of interest within the rectangular shape of the image sensor but smaller in size.

8. The apparatus according to claim 7, configured to turn the assist light on when the exposure of the window of interest period is started, and to turn the assist light off when the exposure of the window of interest period is finished.

9. The apparatus according to claim 5, wherein to control the activity of the assist light a trigger pulse is output to the assist light.

10. A non-transitory computer-readable storage medium encoded with instructions that when executed by a processor, causes an apparatus to perform:
expose an image sensor to light during an image frame period including a window of interest period having a shorter duration than the image frame period;
perform an autofocus, but only during the window of interest period of the image frame period;
turn on an assist light for the autofocus, but only during exposure of the image sensor to light in the window of interest period of the image frame period.

11. An apparatus, comprising:
a processor and a non-transitory computer readable medium comprising instructions configured to cause the apparatus at least to perform the method of claim 1.

* * * * *